No. 835,737. PATENTED NOV. 13, 1906.
W. A. SIMMONS & C. W. GARSIDE.
BRIQUET MOLDING MACHINE.
APPLICATION FILED NOV. 20, 1905.
4 SHEETS—SHEET 1.
Fig. I.
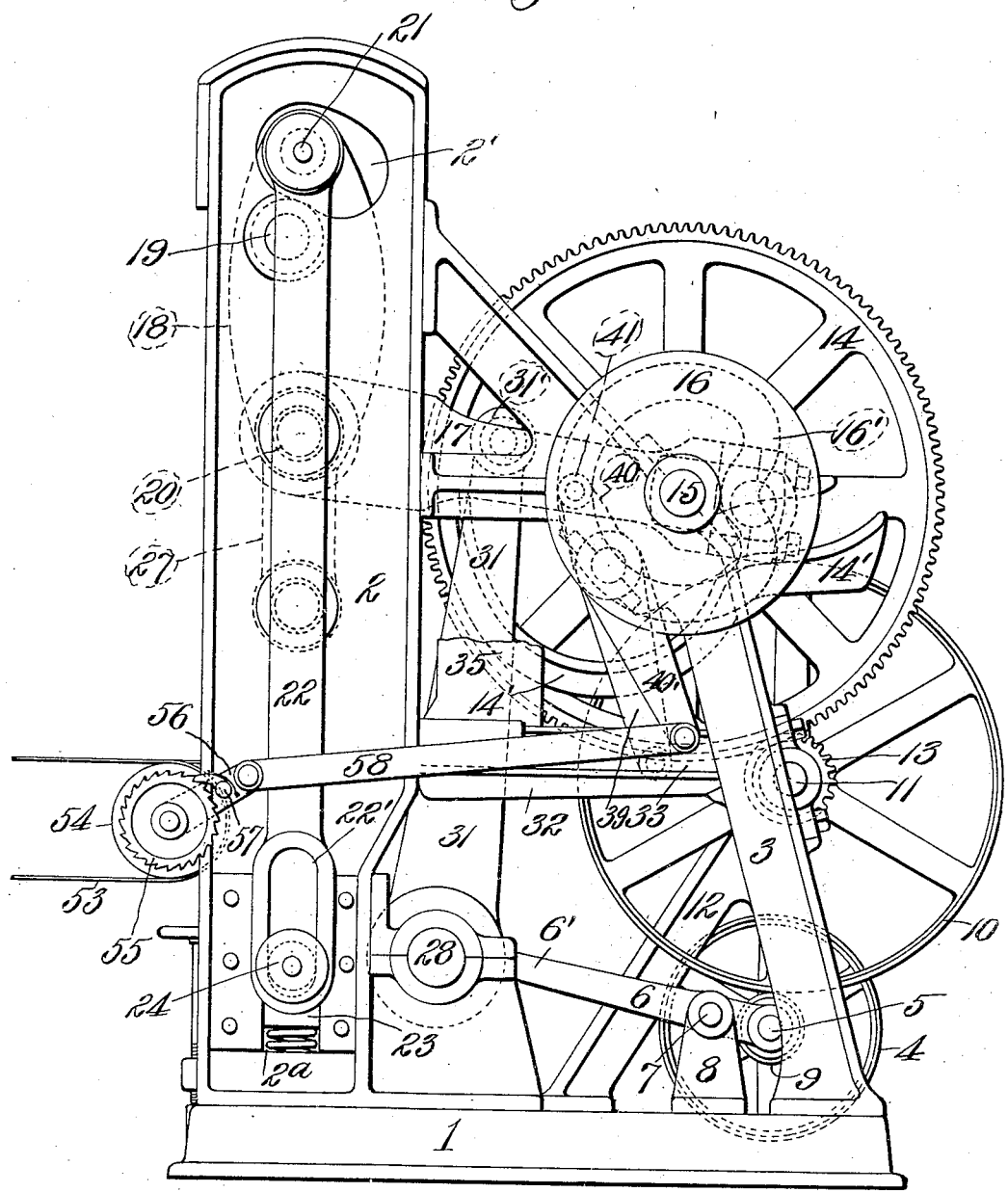

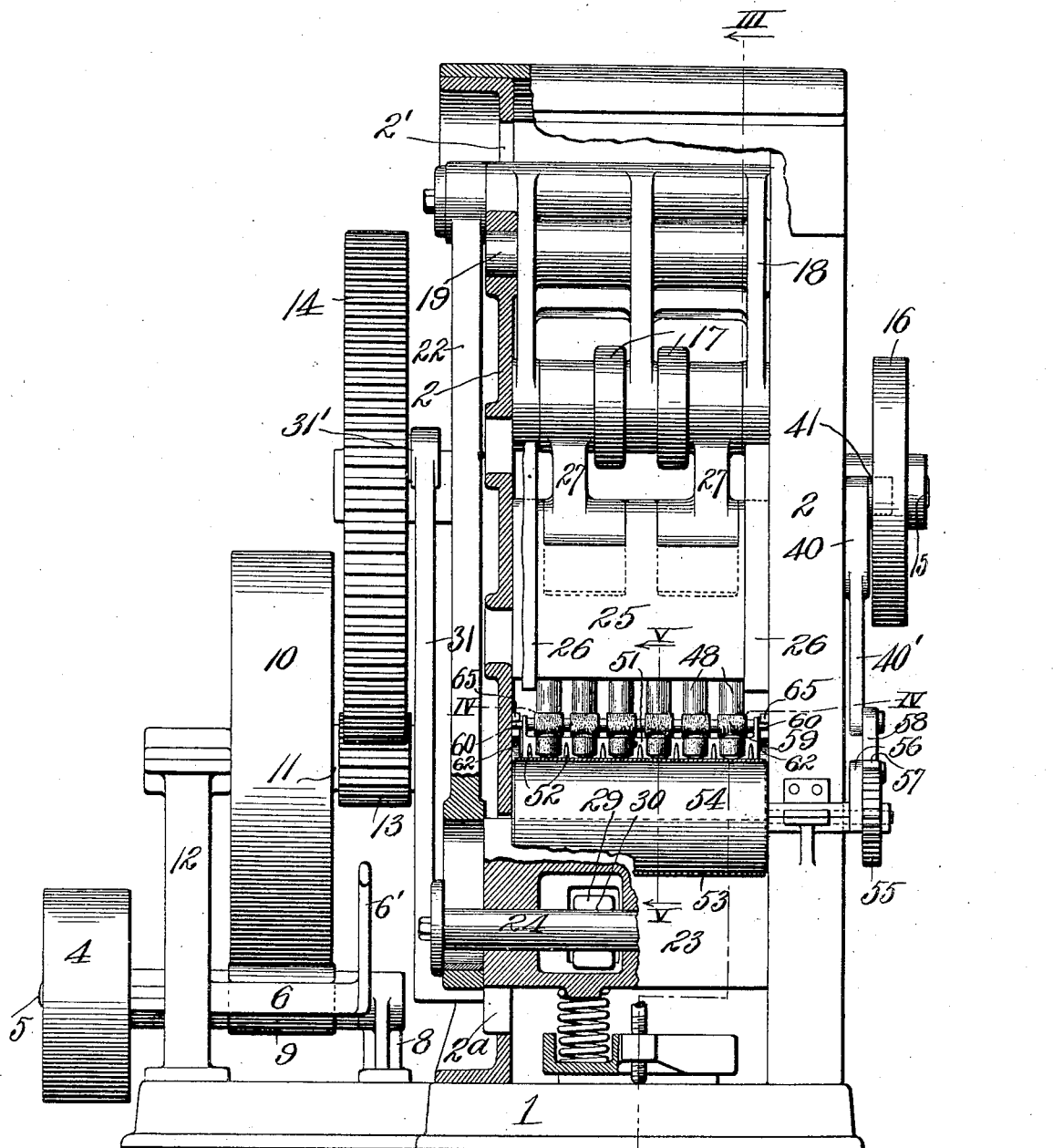

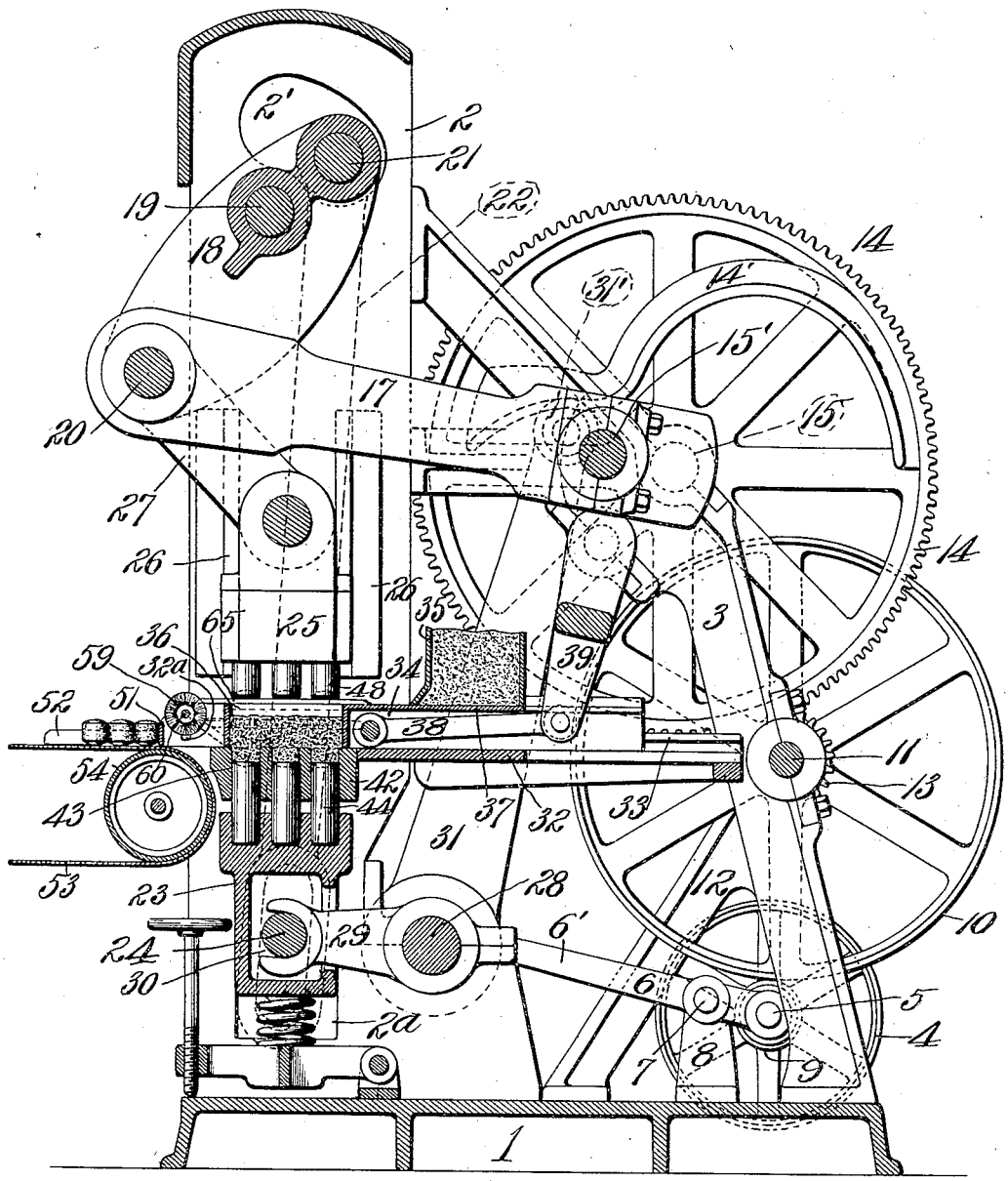

No. 835,737. PATENTED NOV. 13, 1906.
W. A. SIMMONS & C. W. GARSIDE.
BRIQUET MOLDING MACHINE.
APPLICATION FILED NOV. 20, 1905.
4 SHEETS—SHEET 4.
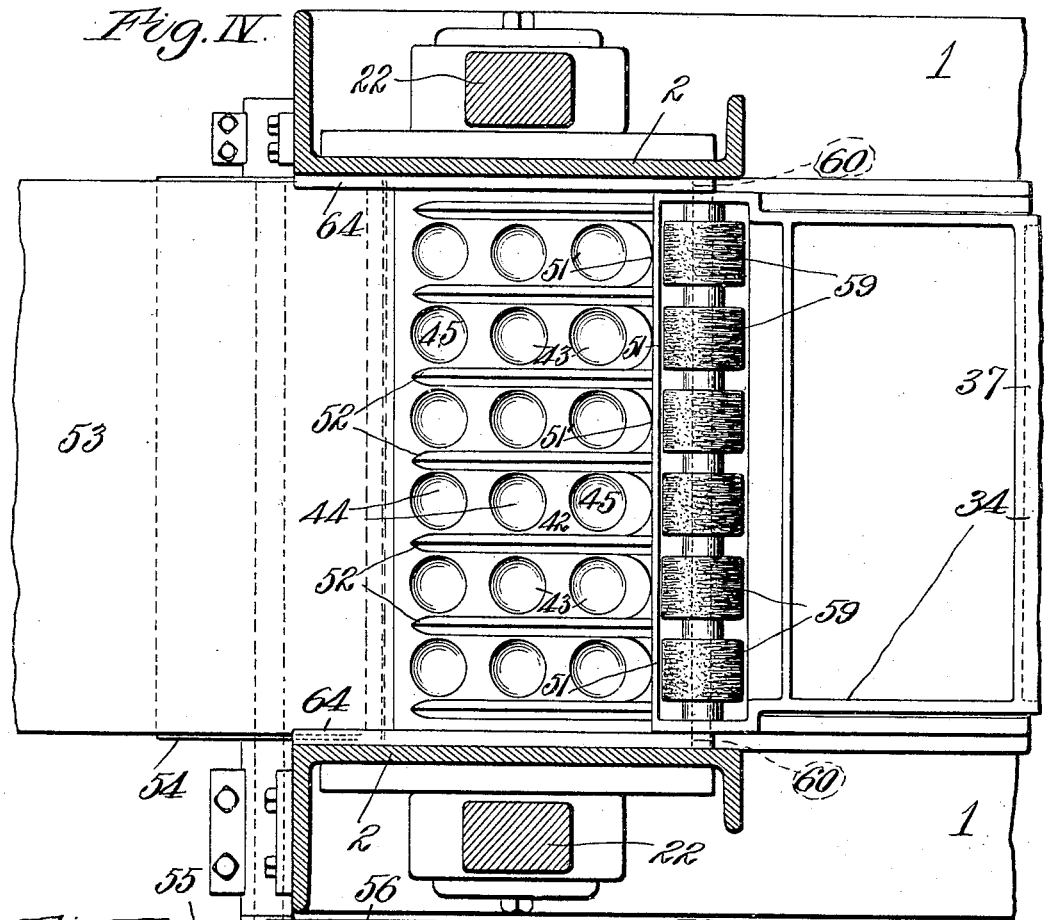
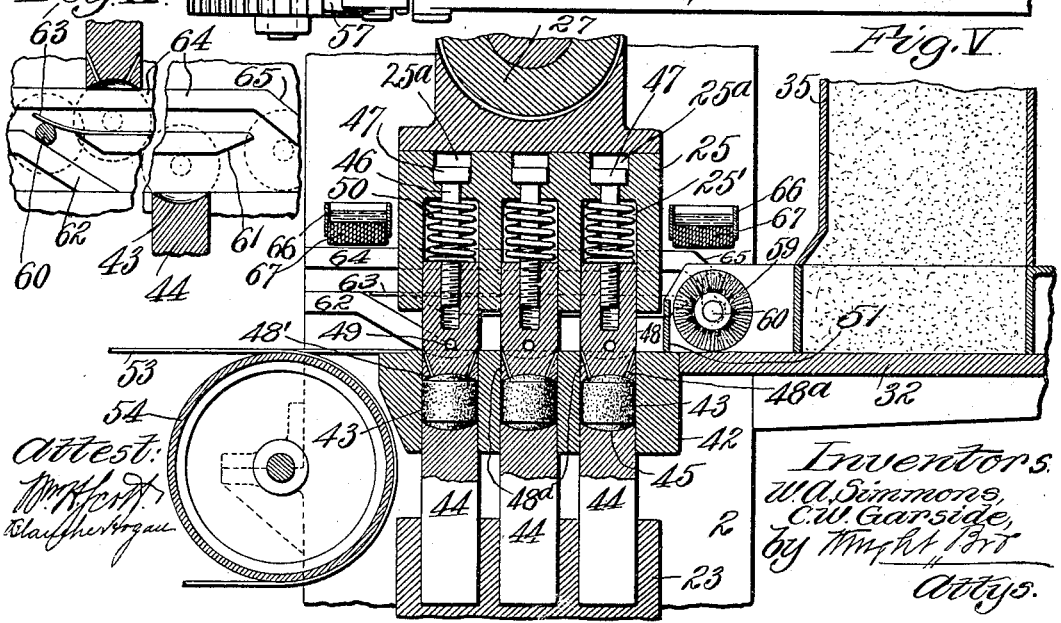

UNITED STATES PATENT OFFICE.

WILLIAM ALONZO SIMMONS, OF NEW YORK, N. Y., AND CHARLES WESLEY GARSIDE, OF ST. LOUIS, MISSOURI, ASSIGNORS TO SCOTT MANUFACTURING COMPANY, OF ST. LOUIS, MISSOURI, A CORPORATION.

BRIQUET-MOLDING MACHINE.

No. 835,737.  Specification of Letters Patent.  Patented Nov. 13, 1906.

Application filed November 20, 1905. Serial No. 288,112.

*To all whom it may concern:*

Be it known that we, WILLIAM ALONZO SIMMONS, residing in the city of New York, in the State of New York, and CHARLES WESLEY GARSIDE, residing in the city of St. Louis, in the State of Missouri, citizens of the United States, have invented certain new and useful Improvements in Briquet-Molding Machines, of which the following is a full, clear, and exact description, reference being had to the accompanying drawings, forming part of this specification.

Our invention relates to a machine for forming briquets from any suitable material, such as coal-slack, culm, lignite, peat, waste, and ores.

The invention has for its primary object to generally improve the organization and contributing elements utilized in briquet-machines, to provide for the effective and expeditious feeding of the briquet material, compression of the briquets, discharge thereof from the molds, and the insurance of a uniformity in the production of compact and flawless briquets.

An additional object of our invention is to furnish a briquet-machine having a large capacity and one that may be operated with a small amount of power, also a machine in which the several parts are so constructed that they can be readily assembled or substitutions easily made for the various parts in the event of breakage or wear.

Figure I is a side elevation of our briquet-machine. Fig. II is a view, partly in front elevation and partly in vertical section. Fig. III is a vertical section taken on line III III, Fig. II, looking in the direction indicated by the arrow crossing said line. Fig. IV is an enlarged horizontal section taken on line IV IV, Fig. II, and showing the parts beneath said line in top or plan view. Fig. V is an enlarged vertical section taken on line V V, Fig. II, looking in the direction of the arrow crossing said line. Fig. VI is an enlarged diagrammatic view illustrating the travel of the brushes by which the pressure-faces of the molding-plungers are cleaned.

1 designates the base of our machine, which is surmounted by side frames 2, reinforced by rear bracing-legs 3.

4 designates the main driving-pulley, the shaft 5 of which is mounted in a swinging frame 6, supported by gudgeons 7, eccentric to the axis of said shaft and mounted in bearing-boxes 8. The driving-pulley shaft has fixed to it a friction-wheel 9, that is adapted to be raised and lowered with said shaft when the swinging frame 6 is oscillated through the medium of a lever 6', extending forwardly therefrom to the front of the machine.

10 designates a power-transmission wheel mounted above the friction-wheel 9, and the shaft 11 of which is journaled in suitable boxes supported by a standard 12 and one of the side-frame brace-legs 3. This transmission-wheel is adapted to receive the frictional engagement of the friction-wheel 9 when said friction-wheel is elevated into contact therewith upon the oscillation of the swinging frame 6.

13 is a pinion fixed to the transmission-wheel shaft 11.

14 designates a master-wheel arranged in mesh with the pinion 13 and supported by a shaft 15, journaled in suitable bearings mounted upon the side-frame brace-legs 3. The master-wheel 14 carries at one of its sides a cam 14', that has utility to be hereinafter mentioned.

16 is a cam-wheel carried by the master-wheel shaft and located at the opposite side of the machine from that at which the master-wheel is located. This cam-wheel is provided with a cam 16', that is of approximately heart shape in contour and which has utility that will be hereinafter set forth. The master-wheel shaft 15 is provided at its central portion with a crank 15', that has connected to it the rear end of a pitman 17. The forward end of this pitman is adapted to operate between the side frames 2.

18 designates an upper toggle-link that is rockingly mounted upon a shaft 19, the ends of which are seated in the side frames 2. The lower end of this upper toggle-link is loosely connected to the pitman 17 by a rod 20, extending through said members. The upper end of the toggle-link has seated in it a rod 21, the ends of which project from the sides of the link and operate in apertures 2' in the side frames 2, near the upper ends thereof.

Provision is thereby made for the movement of said rod 21 eccentric to the axis of the upper toggle-link.

22 designates tension-bars loosely fitted to the extended ends of the rod 21. (See Figs. I and II.) These tension-bars are vertically disposed alongside of the side frames 2. In the lower end of each tension-bar is a vertical slot 22'.

23 designates the lower plunger-ram of the machine. This ram carries plungers, to be hereinafter more particularly referred to. Each end of the ram projects through vertical slots 2ª in the side frames 2 (see Figs. II and III) to guide the ram in its vertical movement. Projecting from the ends of the lower ram are studs 24, that may be in the form of the ends of a shaft passing through the lower ram. These studs are seated in the slots 22' of the tension-bars 22.

25 designates the upper plunger-ram, which is located above the lower ram 23 and the movement of which is directed by guides 26, vertically disposed at the inner faces of the side frames 2. This upper ram carries plungers that will be hereinafter more particularly mentioned. Vertical movement is imparted to the upper plunger-ram by toggle-links 27, connected to the pitman 17 and the upper toggle-link 18 by the rod 20.

28 is a rock-shaft mounted in suitable bearings adjacent to the lower ram 23. This rock-shaft is provided with a forked lever-arm 29, that is loosely fitted to the lower ram at 30 to provide for the impartation of vertical movement to said ram.

31 is a lever fixed to the rock-shaft 28 at the side of the machine at which the master-wheel 14 is located. The lever 31 extends upwardly alongside of said master-wheel, and its upper free end has fitted thereto a roller 31', that is adapted to ride into engagement with the cam 14' of said master-wheel, thereby providing for the actuation of said lever to rock the rock-shaft 28 and raise and lower the lower ram 23 through the medium of the lever-arm 29.

32 designates a table supported in a horizontal position by the side frames 2 and their legs 3, (see Figs. III and V,) the said table being provided at its sides with guides 33.

34 is a charger arranged to operate upon the table 32. This charger is adapted to reciprocate into a position between the upper and lower rams 25 and 23 to conduct material to be compressed into a position between said rams from a feed-chute 35. The charger is directed in its movement by the guides 33, and it is provided with a pocket 36 to receive the material from the chute 35 and a ledge 37, which serves to prevent the egress of material from said chute when the pocket is moved away from it. The charger 32 is actuated through the medium of a link 38, pivoted thereto at one end and having its opposite end pivoted to a crank 39, mounted in suitable bearing-boxes supported by the side-frame legs 3. One of the gudgeons of said crank, mounted in the bearing-boxes, has secured to it a crank-arm 40, (see Fig. II,) which is provided with a roller 41, that rides against the cam 16', carried by the cam-wheel 16. It will be seen that by this construction the cam 16' is caused to oscillate the crank 39 and impart reciprocation to the charger, due to said members being connected by the link 38.

It should be here stated that the parts of our machine thus far specifically described are known by us to be old, and therefore no invention *per se* is herein claimed for them, the parts being described only for the purpose of affording an understanding of the construction and operation of the parts to which our invention relates and which we will now proceed to describe.

42 designates a mold-box suitably supported between the side frames 2 and in a position intermediate of the upper and lower rams 25 and 23. This mold-box contains a plurality of vertical openings 43, (see Figs. III to V, inclusive,) that are adapted to receive from the charger-pocket 36 the material to be compressed. The openings 43 extend entirely through the mold-box and are preferably of cylindrical form, though they may be of any other shape.

44 designates plungers carried by the lower ram 23 and arranged to operate in the mold-box openings 43. These plungers are preferably concaved at their upper ends, as seen at 45, Fig. V.

The upper ram 25 is provided with a plurality of pockets 25', corresponding in number to the number of mold-box openings 43, said pockets being open at their lower ends only. In the upper end of the upper ram are recessed seats 25ª, which surmount the pockets mentioned, but are separated therefrom.

46 designates screw-rods, which occupy the pockets 25' and the heads 47 of which are held from rotation in the recessed seats 25ª.

48 designates upper plungers provided at their upper ends with screw-threaded bores, into which the lower threaded ends of the screw-rods 46 are inserted. Each of the upper plungers is preferably provided with a transverse perforation 49, adapted to receive a rod or other implement by which the plunger is turned to attach and adjust it to the corresponding screw-rod 46, which is held from rotation in the manner explained. The upper plungers are adapted to operate in the openings in the mold-box by entering the upper ends of said openings and passing downwardly therein in opposition to the upward travel of the lower plungers 44. Each upper plunger is preferably concaved at its lower end, as seen at 48', Fig. V, and extending through the lower ends of the plungers are air-ducts 48ª, through which the air present in the mold-box openings is permitted to escape as the upper plungers are forced downwardly in said openings in the act of compressing the material between the upper and lower plungers. The upper plungers are normally held depressed for compressing action upon the material introduced into the mold-box openings by compression-springs 50, located in the pockets 25' between the upper ends of said plungers and the upper ends of said pockets. These springs are of sufficient strength to hold all of the upper plungers uniformly depressed when the material being compressed is of uniform nature. When, however, any material entering into any of the mold-pockets is of such nature that it will not compress with the same facility as material in the other pockets, the springs corresponding to the plungers against which the greater resistance is offered by the material being molded permits said plungers to recede, and therefore act with the same compressing force as the other plungers.

It will be readily understood that when the material to be compressed and formed into briquets is conveyed to the mold-box and deposited into its openings from the charger-delivery pocket 36 the lower ends of said mold-box openings are closed, due to the presence of the lower plungers 44 therein, as seen in Fig. III. The lower ram 23 is previous to the return movement of the charger then lowered under the action of the lever-arm 29 and the parts actuating it, thereby permitting the charger-pocket to be emptied into the mold-box openings. The charger is then caused to recede by its actuating mechanism, so that it is entirely removed from the mold-box. The upper plungers are then moved downwardly under the action of the upper ram-operating means and act to compress the material in the mold-box between them and the lower plungers, the final compressing action being secured through the medium of the tension-bars 22, that act to elevate the lower ram and its plungers simultaneously with the completion of the downward stroke of the upper ram. The upper ram is then again elevated to withdraw it from the mold-box, and the lower ram is elevated through the medium of the lever-arm 29 and its actuating mechanism to lift the completed briquets out of the mold-box, ready to be discharged from the machine.

The discharge of the briquets is accomplished through the medium of the charger 32, which is moved forwardly by the same mechanism as that utilized to deliver the material to the mold-box. At the forward end of the charger is a transverse push-bar 51, that is located in advance of the delivery-pocket 36 and carries a plurality of division-fingers 52. These division-fingers are adapted to move into positions intermediate of the rows of mold-box openings, so that the briquets when discharged from the mold-box will be disposed in rows between pairs of the fingers. The push-bar is provided with concaved seats 51', located between the various division-fingers and which serve to receive the rearmost molded briquets to press thereagainst and carry them forward for their discharge from the machine without injury thereto. As the charger moves forward to deliver a fresh supply of briquet material the push-bar 51 is brought into bearing against the rearmost previously-molded and discharged briquets and acts to push them off the mold-box while the lower plungers are in their uplifted position, during which action the briquets are held separated by the division-fingers and prevented from jostling against each other.

53 designates a conveyer onto which the briquets are delivered to be conducted to any desired distance before being discharged therefrom. This conveyer is preferably in the form of an endless apron operating upon a roller 54 and a distant roller. (Not shown.) The roller 54 is rotated to impart movement to the conveyer through the medium of a ratchet-wheel 55, fixed thereto, a rocking arm 56, loosely fitted to the shaft of the roller, a spring-controlled pawl 57, carried by said rocking arm, a link 58, having one end pivoted to said rocking arm, and an extension-arm 40', forming a part of the cam-actuated crank-arm 40, that serves to impart movement to the charger 32. It will be seen that upon each forward movement of the charger the conveyer is operated through the mechanism described.

59 designates a series of brushes carried by a shaft 60, which is loosely fitted in vertical slots 32ª in the side walls of the charger 32, thus providing for the vertical movement of the brushes during the reciprocation of the charger, for a purpose that will be presently explained.

61 designates intermediate track-rails which are secured to the side frames 2 of the machine above the mold-box 42, these track-rails being preferably beveled at their lower sides adjacent to their ends, as seen in Fig. VI.

62 designates lower inclined track-rails located in advance of the intermediate rails 61. Each of the intermediate track-rails has secured to it and projecting forwardly from its foremost end a spring guard-tongue 63, which is adapted to project into proximity with or against the lower track-rails 62, as seen in Figs. V and VI.

64 designates upper track-rails surmounting the intermediate and lower track-rails, each of these upper track-rails being provided at its rear end with a rearwardly and downwardly extending portion 65. Each time that the charger 32 is moved forwardly the shaft 60, carrying the brushes 59, is carried beneath the intermediate track-rails 61 and, due to frictional engagement therewith, is rotated to impart rotation to the brushes 59. During the travel and rotation of the brushes said brushes act as sweeping members to remove any particles of material from the upper molding-faces of the lower plungers 44, against which they operate, as illustrated in Fig. VI. During the continued forward movement of the charger the brush-shaft is caused to ride upwardly on the inclined lower rails 62, during which movement they pass beneath the spring guard-tongues 63 previous to reaching the top surfaces of the lower rails. Immediately after the brush-shafts have passed onto the top surfaces of the lower rails the spring guard-tongues return to normal or horizontal positions, thereby closing the gaps between the forward ends of the intermediate rails and the inclined lower rails 62. Then as the charger returns on its receding stroke the brush-shaft, which is in an elevated position, has rotation imparted to it by the intermediate rails 61, on which it rides, and the brushes operate with a sweeping action into the molding-faces of the upper plungers 48 to remove the particles of material therefrom in order that they may be thoroughly cleansed before the next molding operation in the same manner as the lower plungers were previously cleansed.

66 designates lubricant-reservoirs adapted to contain any suitable lubricant, such as oil. These reservoirs are located above the path of travel of the brushes 59, and they contain absorbent delivery members 67. The lubricant-reservoirs are so positioned that each time the brushes reach the ends of their forward and rearward strokes they are caused to contact with the absorbent members 67 to receive lubricant. By this arrangement the brushes are always maintained in a lubricated condition, and when they are operated with a sweeping action against the molding-faces of the molding-plungers lubricant is transferred therefrom to said molding-faces in order to provide for the ready separation of the plungers from the briquets after each molding operation.

We claim as our invention—

1. In a briquet-machine, the combination of molding members, means for operating said molding members, a mold-box in which said members operate, and a charger for delivering material to said mold-box; said charger being provided with a push-bar adapted to deliver the molded briquets from said mold-box, and said push-bar being provided with concaved seats, substantially as set forth.

2. In a briquet-machine, the combination of molding members, means for operating said molding members, a mold-box in which said members operate, and a charger for delivering material to said mold-box; said charger being provided with a push-bar adapted to deliver the molded briquets from said mold-box, and division-fingers carried by said push-bar, substantially as set forth.

3. In a briquet-machine, the combination of a mold-box, upper and lower molding members arranged to operate in said mold-box, means for operating said molding members, and means for alternately cleaning the molding-face of one of said molding members and then the molding-face of the other of said members, substantially as set forth.

4. In a briquet-machine, the combination of a mold-box, upper and lower molding members arranged to operate in said mold-box, means for operating said molding members, a charger for conducting material to said mold-box, and means carried by said charger for cleaning the molding-faces of said molding members alternately, substantially as set forth.

5. In a briquet-machine, the combination of a mold-box, upper and lower molding members arranged to operate in said mold-box, means for operating said molding members, a charger for conducting material to said mold-box, and a brush carried by said charger for cleaning the molding-faces of said molding members alternately, substantially as set forth.

6. In a briquet-machine, the combination of a mold-box, upper and lower molding members arranged to operate in said mold-box, means for operating said molding members, a charger for conducting material to said mold-box, and a rotatable brush carried by said charger for cleaning the molding-faces of said molding members alternately, substantially as set forth.

7. In a briquet-machine, the combination of a mold-box, molding members arranged to operate in said mold-box, means for operating said molding members, a charger for conducting material to said mold-box, a rotatable brush carried by said charger for cleaning the molding-faces of said molding members, and means with which said brush engages to impart rotation thereto during its cleaning action, substantially as set forth.

8. In a briquet-machine, the combination of a mold-box, molding members arranged to operate in said mold-box, means for operating said molding members, a charger arranged to deliver material to said mold-box, a brush rotatably mounted in said charger and arranged to operate against the molding-faces of said molding members, and track-rails adjacent to said molding members adapted to be engaged by said brush to cause rotation to be imparted thereto, substantially as set forth.

9. In a briquet-machine, the combination of a mold-box, molding members arranged to operate in said mold-box, means for operating said molding members, a charger arranged to deliver material to said mold-box, a brush rotatably mounted in said charger and arranged to operate against the molding-faces of said molding members, upper and lower track-rails in the path of travel of the shaft of said brush, and intermediate track-rails on which said brush-shaft rides to impart rotation to the brush during its molding-member-cleaning operation, substantially as set forth.

10. In a briquet-machine, the combination of a mold-box, molding members arranged to operate in said mold-box, means for operating said molding members, a charger arranged to deliver material to said mold-box, a brush rotatably mounted in said charger and arranged to operate against the molding-faces of said molding members, lower inclined track-rails onto which the shaft of said brush is arranged to ride, track-rails beneath which said brush-shaft rides in its movement to said lower track-rails, and spring-tongues guarding the gaps between said track-rails, whereby said brush-shaft is caused to ride onto the second-named track-rails upon the return stroke of the charger, substantially as set forth.

11. In a briquet-machine, the combination of a mold-box, upper and lower molding members arranged to operate in said mold-box, a brush for cleaning the molding-faces of both the upper and lower molding members, means for conveying said brush to both of said molding members, and a lubricator arranged in the path of travel of said brush, substantially as set forth.

12. In a briquet-machine, the combination of a mold-box, two sets of molding members arranged to operate in said mold-box, means for operating said molding members, a charger for conducting material to said mold-box, a brush carried by said charger, and means whereby said brush is caused to operate with cleaning action upon the molding-faces of one set of said molding members during the forward stroke of said charger and with cleaning action upon the other set of molding members during the return stroke of the charger, substantially as set forth.

13. In a briquet-machine, the combination of a mold-box, two sets of molding members arranged to operate in said mold-box, means for operating said molding members, a charger for conducting material to said mold-box, a brush carried by said charger, means whereby said brush is caused to operate with cleaning action upon the molding-faces of one set of said molding members during the forward stroke of said charger and with cleaning action upon the molding-faces of the other set of molding members during the return stroke of the charger, and a pair of lubricators arranged in the path of travel of said brush at each end of its stroke, substantially as set forth.

WILLIAM ALONZO SIMMONS.
CHARLES WESLEY GARSIDE.

In presence of—
  NELLIE V. ALEXANDER,
  BLANCHE HOGAN.